United States Patent
Choi et al.

(10) Patent No.: US 9,425,994 B2
(45) Date of Patent: Aug. 23, 2016

(54) DISCOVERING DEVICES IN A NETWORK

(71) Applicants: William H. Choi, Lake Zurich, IL (US); Scott Allan Pearson, Grayslake, IL (US); Anthony J. Bednaroski, Crystal Lake, IL (US)

(72) Inventors: William H. Choi, Lake Zurich, IL (US); Scott Allan Pearson, Grayslake, IL (US); Anthony J. Bednaroski, Crystal Lake, IL (US)

(73) Assignee: Siemens Schweiz AG, Zürich (CH)

( * ) Notice: Subject to any disclaimer, the term of this patent is extended or adjusted under 35 U.S.C. 154(b) by 457 days.

(21) Appl. No.: 13/929,324

(22) Filed: Jun. 27, 2013

(65) Prior Publication Data
US 2015/0006661 A1    Jan. 1, 2015

(51) Int. Cl.
G06F 15/177 (2006.01)
H04L 25/00 (2006.01)
H04L 29/08 (2006.01)
H04L 29/12 (2006.01)
H04L 12/24 (2006.01)

(52) U.S. Cl.
CPC .......... *H04L 25/00* (2013.01); *H04L 61/2038* (2013.01); *H04L 61/2092* (2013.01); *H04L 67/16* (2013.01); *H04L 41/0806* (2013.01)

(58) Field of Classification Search
CPC . H04L 61/2092; H04L 61/2038; H04L 61/20; H04L 29/12207; H04L 29/1232; H04L 41/12; H04L 61/15; H04L 61/1541; H04L 61/30; H04L 25/00; H04L 41/0806; H04L 67/16
USPC ................. 709/224, 220–222, 245
See application file for complete search history.

(56) References Cited

U.S. PATENT DOCUMENTS

| | | | | |
|---|---|---|---|---|
| 7,987,247 | B2* | 7/2011 | Westphal | G05B 15/02 370/252 |
| 8,751,615 | B2* | 6/2014 | Robitaille | H04L 41/12 370/328 |
| 9,294,358 | B2* | 3/2016 | Robitaille | H04L 41/12 |
| 2009/0271001 | A1* | 10/2009 | Westphal | G05B 15/02 700/3 |
| 2011/0006887 | A1 | 1/2011 | Shaull et al. | |
| 2012/0254958 | A1* | 10/2012 | Budampati | H04L 61/2038 726/6 |
| 2013/0151853 | A1* | 6/2013 | Azzouz | H04L 9/08 713/171 |
| 2014/0025806 | A1* | 1/2014 | Robitaille | H04L 41/12 709/224 |
| 2014/0237116 | A1* | 8/2014 | Robitaille | H04L 41/12 709/224 |
| 2015/0039752 | A1* | 2/2015 | Hague | H04L 43/0876 709/224 |
| 2016/0164742 | A1* | 6/2016 | Robitaille | H04L 41/12 709/224 |

* cited by examiner

Primary Examiner — Kenneth R Coulter

(57) ABSTRACT

A network asset manager is provided that comprises a network interface coupled to a processor and a memory that broadcasts a first "Start Discovery" message. The "Start Discovery" message instructs unconfigured devices in an EIA-485 network to generate random number identifiers within a predetermined range and results in receipt of a "I Have Random ID" message from at least one of the unconfigured devices with a specific random number identifier associated with the at least one of the unconfigured devices. Receipt of the "I Have Random ID" message results in a broadcast message from the network interface to at least one of the unconfigured devices using the specific random number identifier.

12 Claims, 9 Drawing Sheets

DISCOVERING DEVICES IN A NETWORK

FIELD OF THE INVENTION

This application relates to the field of data networking, and more particularly to EIA-485 networks.

BACKGROUND

Traditionally, devices in an EIA-485 network had to be configured prior to communicating in a network. A device in an EIA-485 network typically requires that minimum configuration data is known, such as MAC addressing and baud rate, before any communication may occur. The EIA-485 network standard (also known as TIA/EIA-485 or RS485) does not provide an approach for discovering devices connected to the EIA-485 network.

In practice, a technician must go to each device in an EIA-485 network and address the device before communication may occur with that device. This labor intensive approach may be a time consuming process and some devices may not even be easily accessible (such as in building automation systems).

While traditional approaches for connecting devices to an EIA-485 network are adequate when minimal configuration information is known, a need exists for identifying and commissioning devices from a centralized location for devices attached to an EIA-485 network when these devices have no configuration data defined.

SUMMARY

In accordance with one embodiment of the disclosure, there is provided an approach for discovering devices attached to an EIA-485 network and configuring the device for communication with other devices in the network. The approach provides for a network asset manager to broadcast discovery messages that instruct devices to generate a random number identifier for use as temporary device identification. The approach uses collisions, framing errors and data validation errors to isolate each unique device attached to the EIA-485 network.

The above described approaches and advantages of the present invention, as well as others, will become more readily apparent to those of ordinary skill in the art by reference to the following detailed description and accompanying drawings. While it would be desirable to have a manager that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DESCRIPTION

Figure 1:
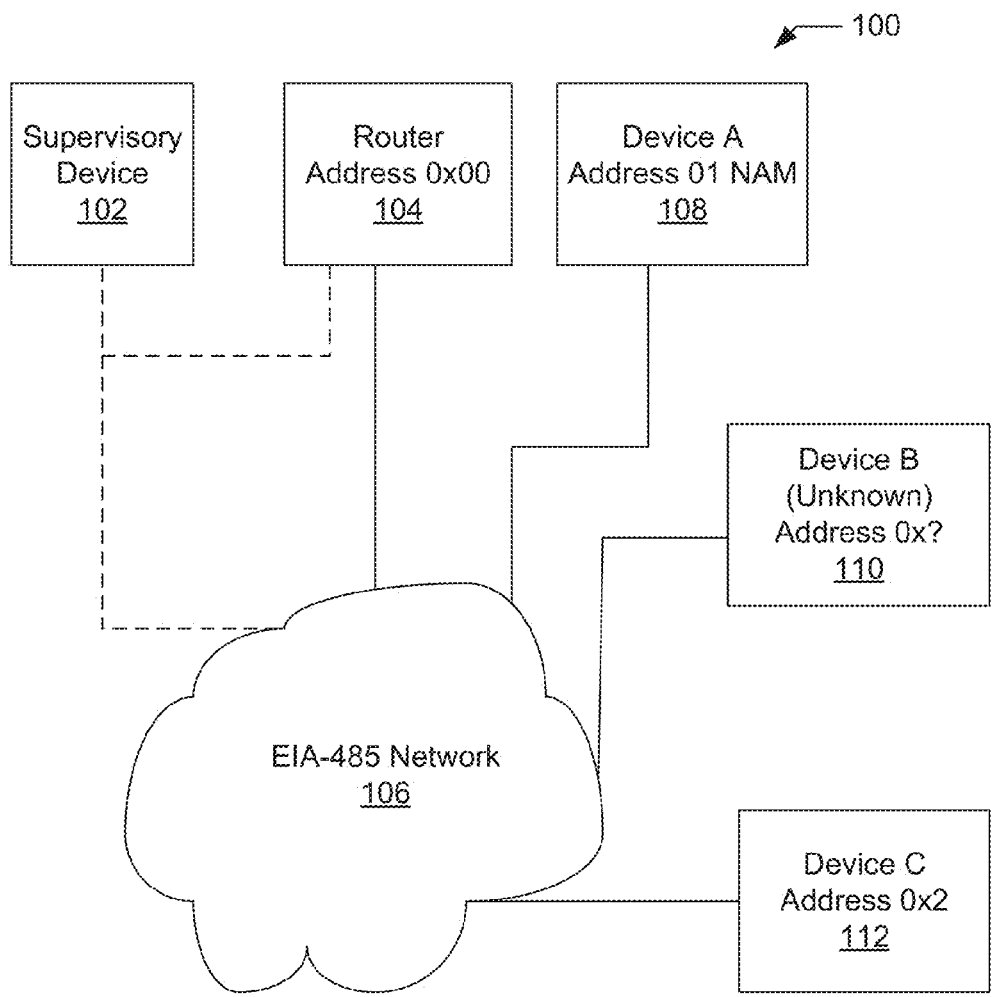
FIG. 1 illustrates a diagram of an EIA-485 network with an unconfigured device in accordance with an example implementation.

In FIG. 1, a diagram 100 of an EIA-485 network 106 with an unconfigured device 110 in accordance with an example implementation is depicted. A supervisory/tool device 102 may be connected to the network that supports an operation and maintenance function or in other implementations may be connected to a router for accessing devices on another network. The supervisory device 102 may be a workstation or server executing the operation and maintenance functions that may reside in software, hardware, or a combination of software and hardware. A router 104 may also be connected to the EIA-485 network that enables the supervisory device 102 to communicate with other devices in the EIA-485 network 106. Multiple devices may also be connected to EIA-485 network 106, such as Device A 108, B 110 and C 112 (where at least B is an unknown device). Typically, one of the devices (A 108, B 110 and C 112) will assume the role of a network asset manager (NAM). In the current example, Device A 108 will assume the role of NAM.

The network 106 in the current example is an EIA-485 network, also known as ANSI/TIA/EIA-485, TIA-485-A, EIA-485 or RS-485, which is the standard defining the electrical characteristics of drivers and receivers for use in balanced digital multipoint systems. The standard is published by the Telecommunications Industry Association/Electronic Industries Alliance (TIA/EIA). The EIA-485 network approach enables the configuration of inexpensive local networks and multidrop communications links. It offers data transmission speeds of 35 Mbit/s up to 10 m and 100 kbit/s at 1200 m. Because it uses a differential balanced line over twisted-pair (like RS-422), it can span relatively large distances (up to 4,000 feet (1,200 m)). A rule of thumb is that the speed in bit/s multiplied by the length in meters should not exceed $10^8$. Thus a 50 meter cable should not signal faster than 2 Mbit/s. Commercial examples of an EIA-485 network are Modbus, Siemens Building Technologies' FLN Protocol, and Siemens Building Technologies' ALN Protocol, and BACnet's Master/Slave Token Passing (MSTP) network.

Figure 2:
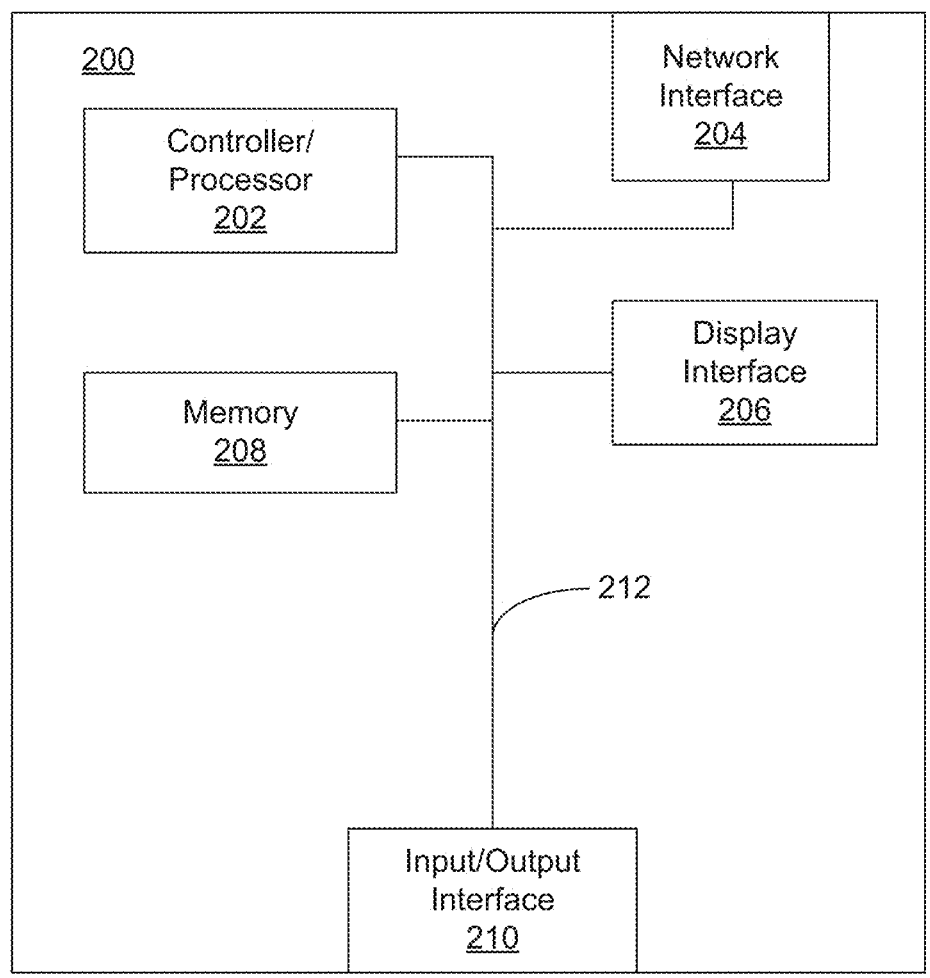
FIG. 2 illustrates a block diagram of a processor-controlled device in accordance with an example implementation.

In FIG. 2, a block diagram of a device 200 controlled by a controller/processor 202 is depicted in accordance with an example implementation. The controller/processor 202 is electronically coupled to a network interface 204, display interface 206, memory 208, and input/output interface 210. The controller/processor 202 may be a microprocessor, application specific integrated circuit (ASIC), microcontroller, digital signal processor (DSP), digital circuits functioning as a state machine, analog circuits functioning as a state machine, or a combination of analog and digital circuits functioning as a state machine. The controller/processor typically communicates with other interfaces and memory via data and address buses, shown as 212 in FIG. 2.

The network interface 204 may be an EIA-485 network. The display interface 206 is typically present in computer work stations, servers, and smart devices, such as tablets and smart telephones. Not all processor controlled devices have displays, such as smart switches and environmental controls in heating systems.

The memory 208 may be random access memory (RAM), read only memory (ROM) or a combination of RAM and ROM. The memory 208 may be configured for data, programs/software, and operating systems. In other implementations, separate memory may be dedicated for operating systems, data and/or programs/software.

Input/output interface 210 may be coupled to devices such as hard disc drives, floppy disc drives, memory readers for reading memory chips, keyboards, mice, touch screens, infrared signal receivers, to give but a few examples. The input/output interface 210, typically provides a serial or parallel data connection to the bus 212 that is controlled by the controller/processor 202. Devices that typically connect to an EIA-485 network are controller/processor controlled with at least a memory, network interface, and some type of input/output interface.

Figure 3:
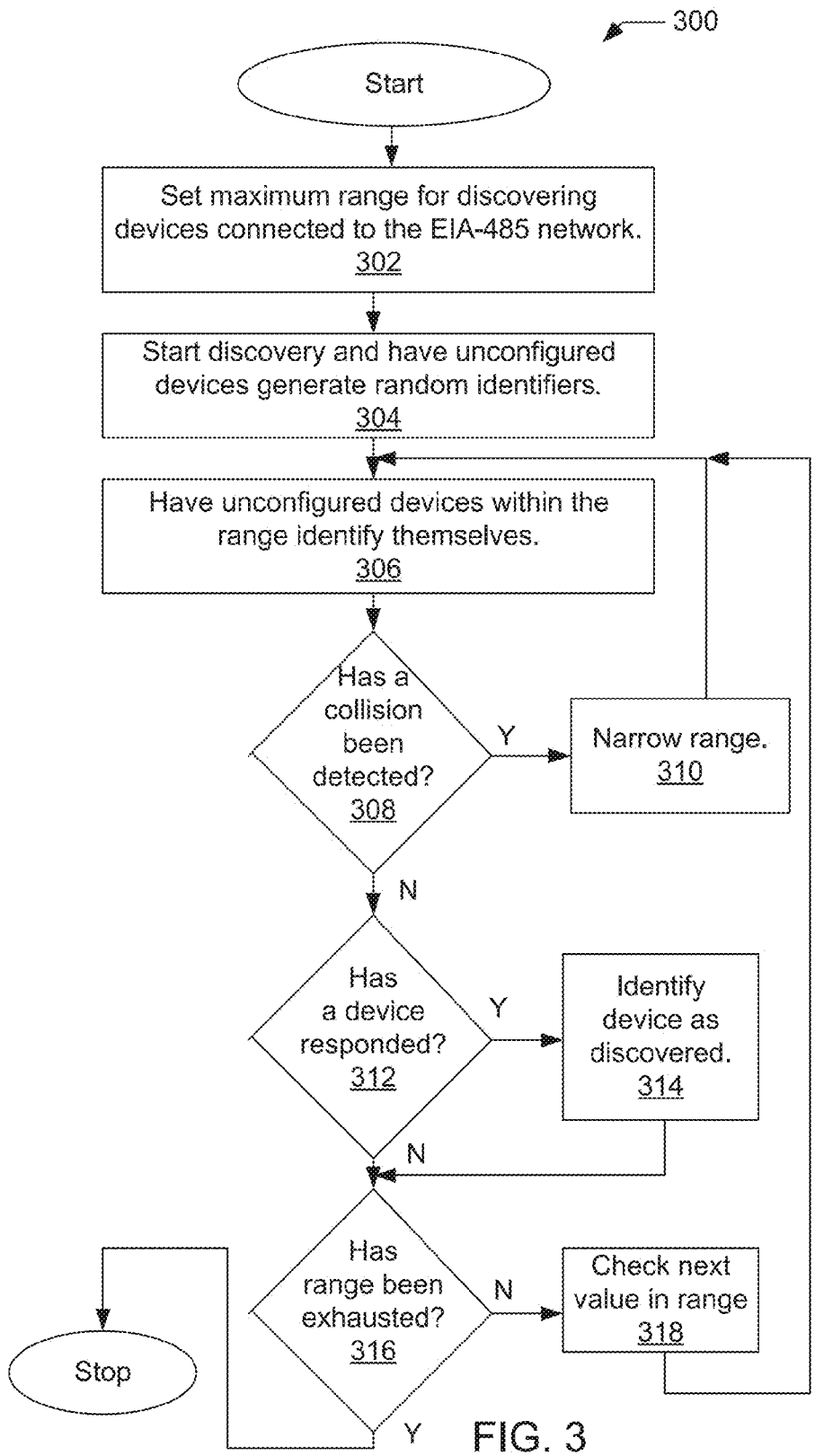
FIG. 3 illustrates a flow diagram of an approach employed by a network asset manager when auto-discovering the unconfigured device of FIG. 1 in accordance with an example implementation.

Turning to FIG. 3, a flow diagram 300 of the approach employed by a network asset manager (NAM) 108 when auto-discovering unconfigured device (device B 110) of FIG. 1 is shown. NAM 108 is responsible for performing the auto-discovery to discover unconfigured devices in the EIA-485 network 106. This approach employs a NAM 108 that requests unique identification numbers from unconfigured devices. The commands include a minimum value and a maximum value that defines a range of unique identification numbers that may be used by the different devices, such as Device B 110 of FIG. 1, to determine if the device should respond with its unique identification number. As the search for unknown devices begins, the minimum and maximum values are set such that the range for possible devices is set to the max range value in step 302. The max range value is a range that is guaranteed to include all generated random numbers for all devices in the EIA-485 network. In the current example, an initial range that encompasses all of the possible randomly generated 32 bit numbers that may be used as identification numbers will result in detection of all unknown devices (that are able to communicate without collisions or other issues), such as Device B 110 of FIG. 1. In step 304, discovery of unconfigured devices is started and unconfigured devices are instructed to generate a random number identifier. In step 306, devices within the filter range are instructed to identify themselves.

When multiple devices respond, data collisions (framing errors, overrun errors, cyclic redundancy check (CRC) errors) on the network will occur. The NAM 108 will detect these collisions indicating that multiple devices exist within the current range in step 308. Detection by the NAM 108 of collisions may be by detecting framing errors and CRC errors. When collisions occur, the NAM 108 will narrow the range (sub-range) 310 and repeat the request in step 306. This process will continue until there are no collisions detected by the NAM 108 in the EIA-485 network. When a response is received without network collisions in step 312, the NAM 108 identifies the device as discovered and continues the search in step 314. If no response is received in step 312, then the current range is empty or exhausted in step 316 and does not need to be searched any further. Otherwise the search within the max range continues in step 318. A binary search algorithm may be used to search the full range. This binary search algorithm may be optimized to complete the search in as few network commands as possible to limit the time required to complete discovery of unknown devices, such as Device B 110 of FIG. 1.

Figure 4:
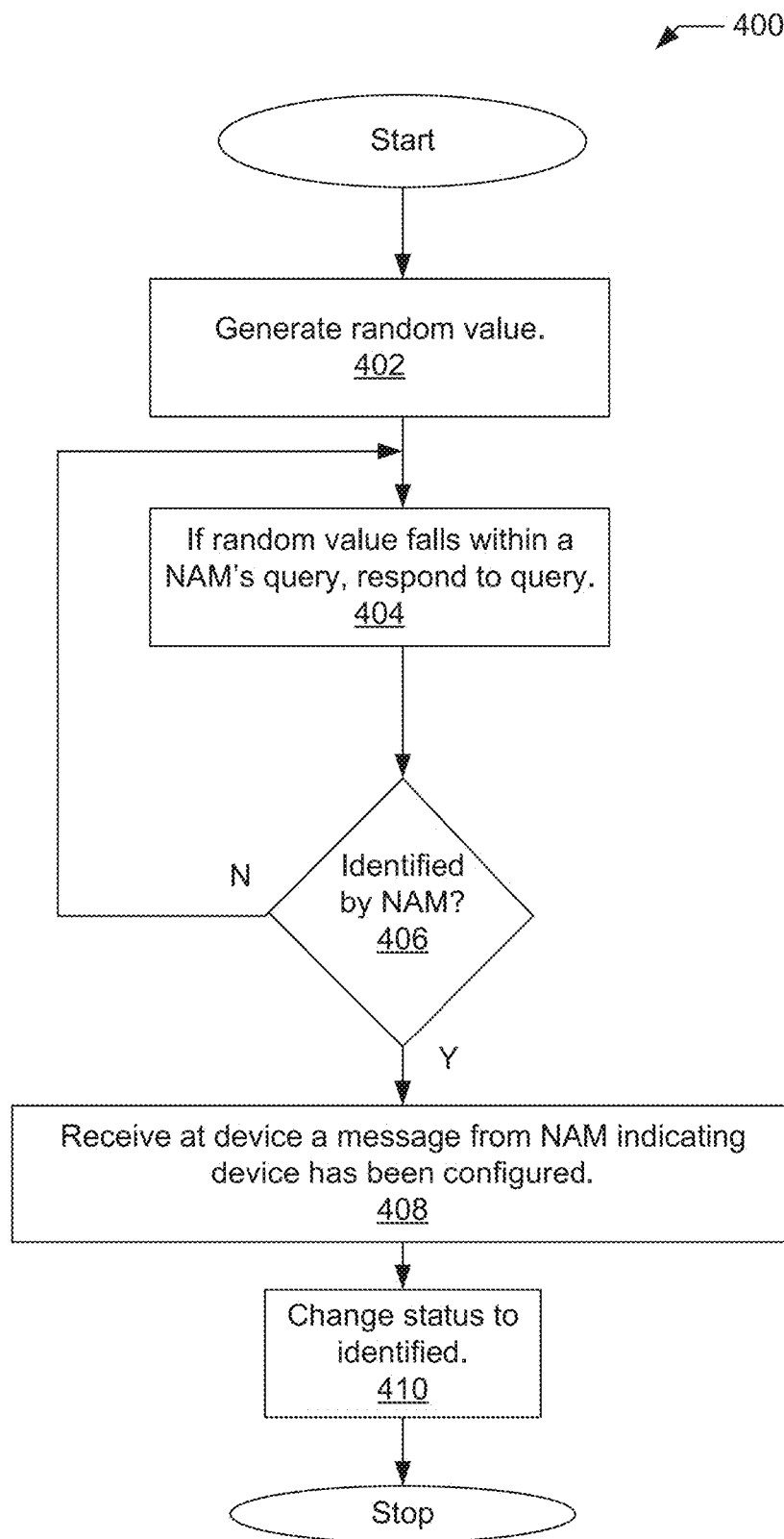
FIG. 4 illustrates a flow diagram of the approach employed by the unconfigured device when queried by the network asset manager of FIG. 1 in accordance with an example implementation.

In FIG. 4, a flow diagram 400 of the approach employed by the unconfigured device, such as Device B 110 of FIG. 1, when queried by the NAM 108 of FIG. 1 in accordance with an example implementation is shown. An unconfigured device generates a random value in step 402 when queried by the NAM 108 FIG. 1. The random value and the unique serial number may be used to uniquely identify each device in the EIA-485 network. The NAM 108 will query all devices using a range (min value, max value). If the unconfigured device's random value falls within the range, it will respond to the query in step 404. When the Device B 110 of FIG. 1 is identified in step 406 by the NAM 108, the NAM 108 will send a message that indicates Device B 110 is configured in step 408. In response to that message, Device B 110 will change the status to "identified" in step 410 and it no longer participates in the discovery process. The discovery process may continue until the range being queried by the NAM 108 is exhausted.

Figure 5:
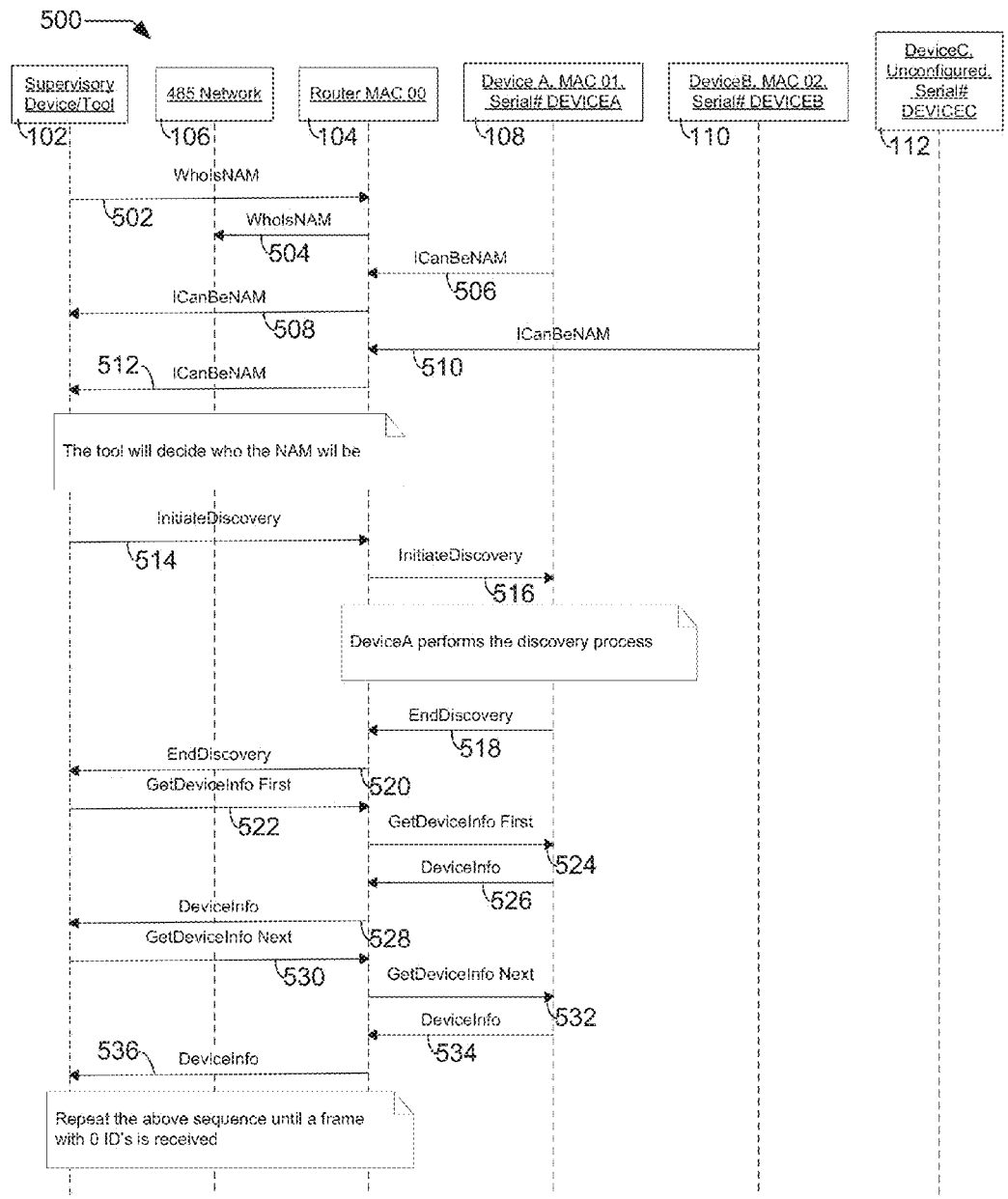
FIG. 5 illustrates a message flow diagram for selecting a network asset manager of FIG. 3 and discovering unconfigured devices in accordance with an example implementation.

Turning to FIG. 5, a diagram 500 of a message flow for selecting a network asset manager of FIG. 3 and discovering unconfigured devices in accordance with an example implementation is depicted. The network may be virtual, physical, or a combination of virtual and physical networks. A "WhoIs-NAM" message 502 may be sent from the supervisory device/tool 102 to the Router 104 requesting identification of the NAM. The Router 104 may have an associated MAC address. Upon receipt of the "WhoIsNam" message 502, the Router 104 may then broadcast a "WhoIsNam" message 504 to the entire EIA-485 network 106.

Device A 108 may then respond to Router 104 with an "ICanBeNAM" message 506. The router 104 then sends an "ICanBeNAM" message 508 to the supervisory device/tool 102. Similarly, Device B may send a "ICanBeNAM" message 510 to router 104. Router 104 then sends another "ICanBeNAM" message 512 to the Supervisory Device/tool 102. The Supervisory Device/Tool 102 then identifies which device will be NAM, Device A 108 in the current example. The selection of the NAM by the Supervisory Device/Tool 102 may be based upon device addresses (lowest non-router address is NAM, Device A 108 in the current example), device type, first to respond, or other approach that results in a configured device being identified as the NAM. Once a NAM is identified, discovery of unconfigured devices may occur.

An "InitiateDiscovery" message 514 is sent from the Supervisory Device/Tool 102 to the Router 104 to initiate the discovery of unconfigured devices. The Router then sends an "InitiateDiscovery" message 516 to the NAM (Device A 108). Device A 108 then performs the discovery of unconfigured devices as the NAM. Once discovery of unconfigured devices is complete, Device A 108, acting as NAM, sends a "EndDiscovery" message 518 to the Router 104. The Router 104 then sends a "EndDiscovery" message 520 to the Supervisory Device/Tool 102 signaling the end of discovery. The Supervisory Device/Tool 102 may then send a "GetDeviceInfo First" message 522 to the Router 104 to get the first configured device information. The Router 104 then sends a "GetDeviceInfo First" message 524 to the NAM (Device A 108). The NAM responds with a "DeviceInfo" message 526 that is sent to the Router 104 and in turn sends a "DeviceInfo"

message 528 to the Supervisory Device/Tool 102 with the information from the NAM (Device A 108).

The Supervisory Device/Tool 102 then sends a "GetDeviceInfo Next" message 530 to the Router 104. The Router 104 then send a "GetDeviceInfor Next" message 532 to the NAM (Device 108). The NAM responds to the Router 104 with a "DeviceInfo" message 534. The Router 104 then sends a "DeviceInfo" message 536 to the Supervisory Device/Tool 102 with the device information from the NAM (Device A 108). The device information reporting 530-536 may be repeated until the NAM signals that all configured devices have been reported to the Supervisory Device/Tool 102. In the current example, a frame with "0" information being received at the Supervisory Device/Tool 102 signals all configured devices have been reported.

Figure 6:
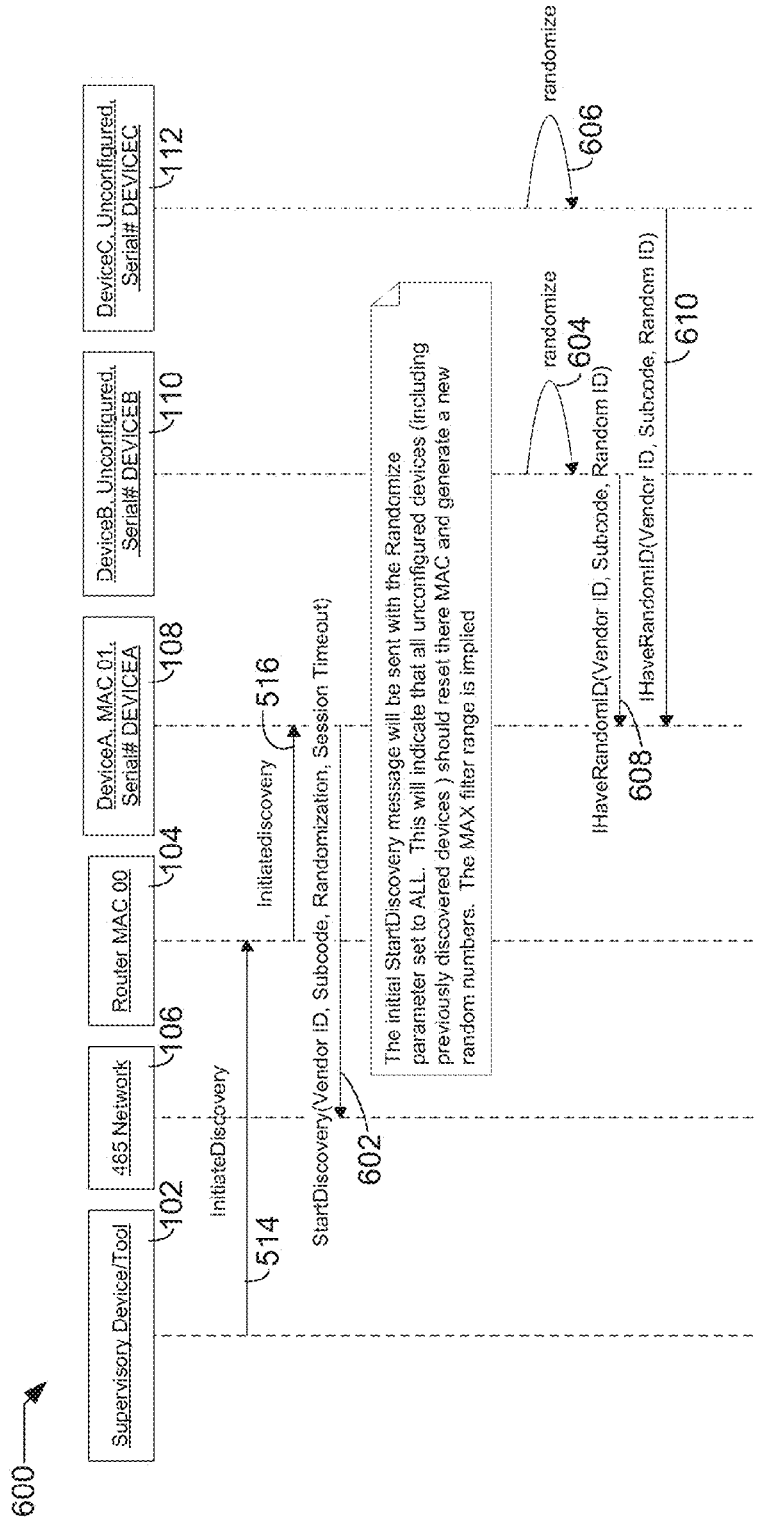
FIG. 6 illustrates a message flow diagram of an initial auto-discovery request for unconfigured device in accordance with an example implementation.

In FIG. 6, a diagram 600 of a message flow of an initial auto-discovery request for an unconfigured device in accordance with an example implementation is illustrated. In FIG. 6, both Device B 110 and Device C 112 are shown as unconfigured and in need of being discovered. The "InitiateDiscovery" message 514 is sent from the Supervisory Device/Tool 102 to the Router 104. The Router then sends the "InitiateDiscovery" message 516 to the NAM (Device A 108). The NAM (Device A 108) responds by sending a "StartDiscovery" message 602 to the network 106 with vendor ID, subcode, randomization and session timeout parameters in the current implementation. In other implementations, additional or different parameters may be included with the "StartDiscovery" message 602. The randomize parameter is set to ALL in order to indicate that all unconfigured devices (including previously discovered devices) should generate new random numbers. The maximum filter range (defined by a maximum value and a minimum value in the current implementation) is initially employed when the "StartDiscovery" message 602 is sent or broadcast to the network 106.

Unconfigured device B 110 generates a new random number 604 and unconfigured device C 112 generates a new random number 606. The random numbers are used to identify the different devices. After generating a random number 604, Device B 110 responds to the NAM (Device A 108) with a "IHaveRandomID" message 608. The "IHaveRandom ID" message 608 may have additional parameters, such as vendor ID, subcode, and random ID. Similarly, device C 112 responds to the NAM (Device A 108) with a "IHaveRandomID" message 610 with the same associated parameters.

Figure 7:
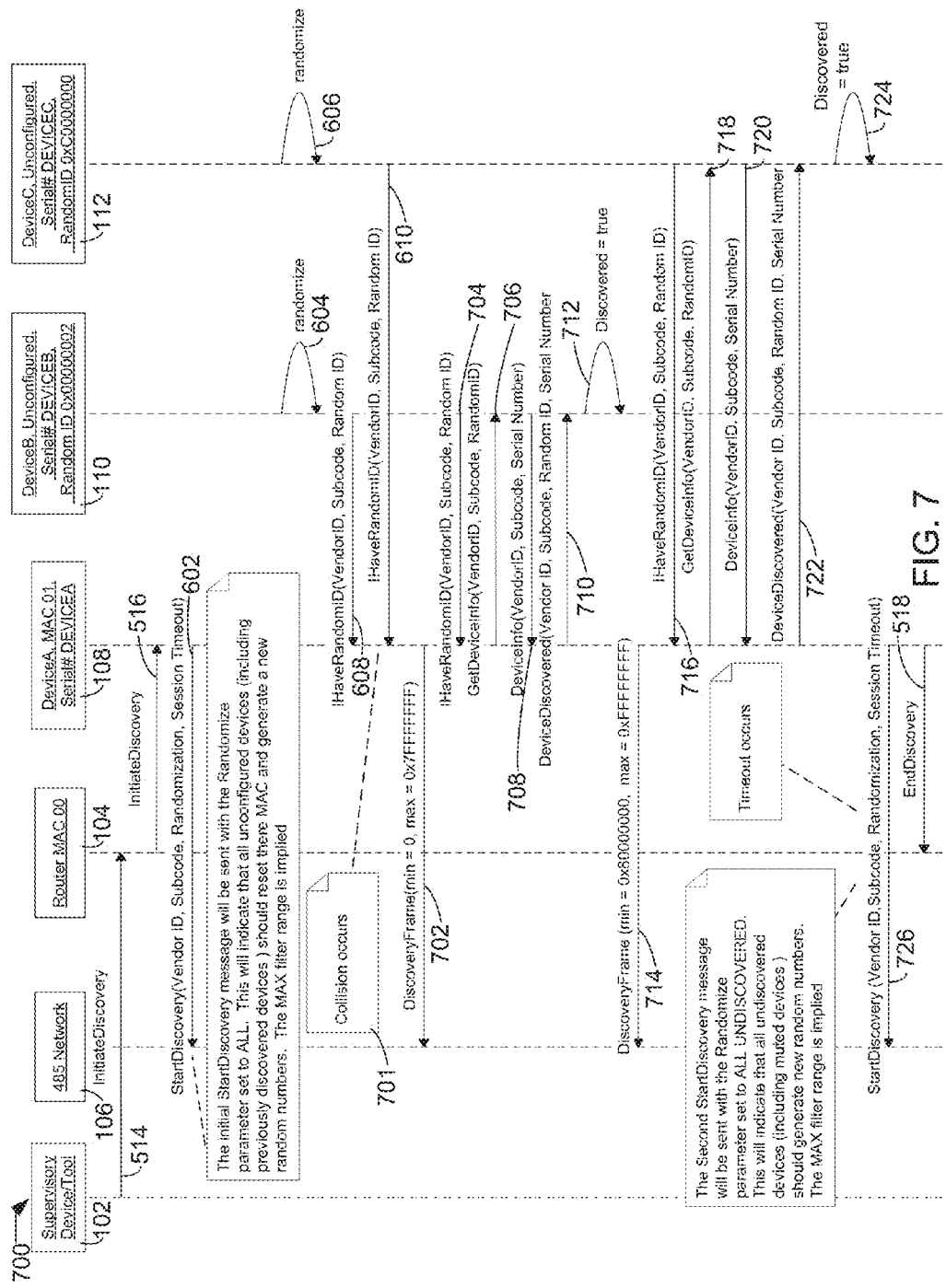
FIG. 7 illustrates a message flow diagram of a secondary discovery phase in accordance with an example implementation.

Turning to FIG. 7, a diagram 700 of a message flow of a secondary discovery phase in accordance with an example implementation is depicted. The Supervisory Device/Tool 102 initiates discovery of unconfigured devices, by sending the "InitiateDiscovery" message 514 to the Router 104. The Router 104 then sends a "InitiateDiscovery" message 516 to Device A 108 that is acting as the NAM. Device A 108 responds to the "InitiateDiscovery" message 516 by sending (broadcasting) a "StartDiscovery" message 602 to the entire 485 network 106. The randomize parameter in the "StartDiscovery" message 602 is set to ALL with a maximum filter range, so all unconfigured devices attached to the 485 network 106 will generate new random numbers as shown in FIG. 7 with 604 and 606 randomize arrows. Device B 110 generates 0x00000002 as its random number identification and Device C 112 generates 0xC0000000 as its random number identification.

The unconfigured devices, such as Device B 110 and Device C 112 in the current example, respond to the NAM (Device A 108) once they have generated their respective random numbers with the "IHaveRandomID" messages 608 and 610 respectively. It is possible the transmission of the "IHaveRandomID" messages 608 and 610 will result in a collision 701 when being received at the NAM. If a collision 701 does occur, the NAM (Device A 108) sends (broadcasts) a "DiscoveryFrame" message 702 with a range less than the maximum range, in the current example the reduced range is between 0 and 0x7FFFFFF. As the Random ID of Device B 110 is within the reduced range, it responds to the NAM with an "IHaveRandom ID" message 704 and associated parameters. The NAM (Device A 108) may then send a "GetDeviceInfo" message 706 with parameters for VendorID, Subcode, and RandomID to the discovered Device B 110. The "GetDeviceInfo" message 706 is depicted as a message to Device B 110, but in practice, the "GetDeviceInfo" message may be a broadcast message. In response to the "GetDevice message 706, Device B 108 sends its device information and parameters (such as VendorID, subcode, and serial number) in a "DeviceInfo" message 708 to the NAM (Device A 108). Device B 110, once the "DeviceDiscovered" message 710 has been received, may then set a parameter that indicates the device has been discovered to "true" 712. In other implementations, other types of indicators may be used to indicate the device has been discovered, such as a state change. As Device C 112 was not in the range identified in the "DiscoveryFrame" message 702, it did not respond to the NAM.

The NAM (Device A 108) then proceeds to check the unchecked portion of the original range, 0x80000000 to 0xFFFFFFFF by sending (broadcasting) a "DiscoveryFrame" message 714 with the range defined by the minimum=0x80000000 and maximum=0xFFFFFFFF values to the 485 network 106.

The random generated number of Device C 112 falls within the range identified in the "DiscoveryFrame" message 714, so it responds to the NAM while that of Device B 110 falls outside of the range. Device C 112 responds to the "DiscoveryFrame" message 714 from the NAM (Device A 108) with an "IHaveRandomID" message 716 that may have a number of associated parameters, such as vendorID, subcode and random ID. The NAM (Device A 108) may then request device information from Device C 112 by sending Device C 112 a "GetDeviceInfo" message 718. Device C 112 may then respond to the NAM (Device A 108) with a DeviceInfo message 720 that may have device information such as vendorID, subcode and serial number information. Upon the NAM (Device A 108) receiving the "DeviceInfo" message 720 from Device C 112, the NAM may send a "DeviceDiscoved" message 722 to Device C 112 that indicates the device is now Discovered in the network. Device C 112 may then set a parameter associated with being discovered to true 724. The NAM (Device A 108) may then send a "StartDiscovery" message 726 with a maximum range to the 485 network 106. If the session timeout occurs, and no responses from undiscovered devices have been received, the "EndDiscovery" message 518 may be sent from the NAM (Device A 108) to the Router 104.

Figure 8:
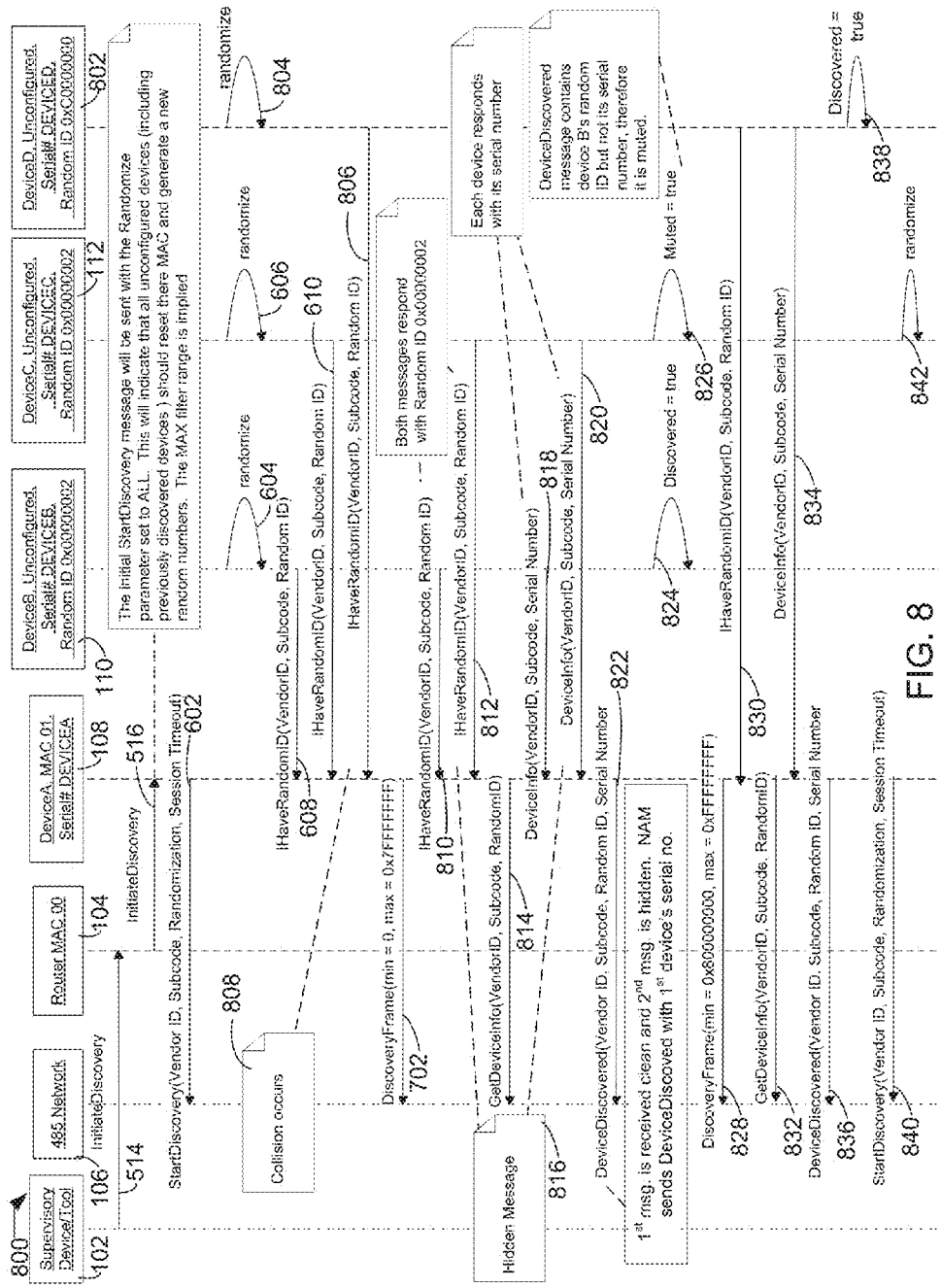
FIG. 8 illustrates a message flow diagram of discovery of an unconfigured device with hidden devices in accordance with an example implementation.

In FIG. 8, a diagram 800 of a message flow of discovery of unconfigured devices (Device B 110, Device C 112, and Device D 802) with hidden devices in accordance with an example implementation is depicted. The Supervisory Device/Tool 102 initiates discovery by sending the "InitiateDiscovery" message 514 to the Router 104. The Router then sends the "InitiateDiscovery" message 516 to the NAM (Device A 108). The NAM then sends (broadcasts) a "StartDiscovery" message 602 to the 485 network 106. The "StartDiscovery" message 602 has a max filter range and instructs unconfigured devices to generate new random numbers that are used as random identifications. In the current example implementation, previously discovered but unconfigured devices may also generate new random numbers. In response to the "StartDiscovery" message 602, Device B, 110 Device C 112, and Device D 802 generate random identifications 604, 606, and 804 respectively.

Device B 110, Device C 112, and Device D 802 then respond with "IHaveRandomID" messages 608, 610, and 806 respectively. A collision 808 may occur between "IHaveRandomID" message, such as 610 and 806. In response to a collision being detected by the NAM (Device A 108), the "DiscoveryFrame" message 702 is sent or broadcast by the NAM with a reduced range. Both Device B 110 and Device C 112 fall with the range and respond with "IHaveRandomID" messages 810 and 812 with the same random IDs, 0x00000002 in the current example. Since the NAM received the "IHaveRandomID" message, it broadcasts a GetDeviceInfo message 814 for that random number identification to the network. Two devices respond with DeviceInfo messages 818 and 820. One of the messages is received and the other is hidden 816.

The NAM then sends (broadcasts) a "DeviceDiscovered" message 822 with the serial number that was received in the "DeviceInfo" message and random number identification. If the serial number and random number identification in the "DeviceDiscovered" message corresponds to Device B 110, then the discovered parameter at Device B 110 is set to true 824. The "DeviceDiscovered" message 822 will also be received at Device C 112 with Device C's 112 random identification number, but not the right serial number. Device C 112 will then set a mute parameter to true 826 and not respond until a StartDiscovery message is received.

The NAM then continues with discovery, by sending a "DiscoveryFrame" message 828 with the rest of the filter range to the 485 network 106. Device D 802 has a random number identification that resides in the filter range set in the "DiscoveryFrame" message 828 and responds by sending a "IHaveRandomID" message 830 to the NAM (Device A 108). The NAM (Device A 108) then broadcasts a "GetDeviceInfo" message 832 to the 485 network 106. The Device D 802 responds with the "DeviceInfo" message 834 to the NAM (Device A 108). The NAM (Device A 108) then informs Device D 802 that it has been discovered with a "DeviceDiscovered" message 836 being broadcast to the 485 network. Device D 802 then sets a parameter to indicate that it has been discovered 838. The NAM (Device A 108) then starts discovery again by sending (broadcasting) a "StartDiscovery" message 840 with the randomize parameter set to "Undiscovered" to the 485 network 106. All previously undiscovered devices will randomize their random number identification (Device C 112 in the current example) 842. The approach then continues as previously described. It is understood that in FIG. 8, a collision may be possible between the "DeviceInfo" messages 818 and 820. If such a collision were to occur, it would be treated the same as a collision caused by multiple "IHaveRandomID" messages (as described in FIG. 7).

Figure 9:
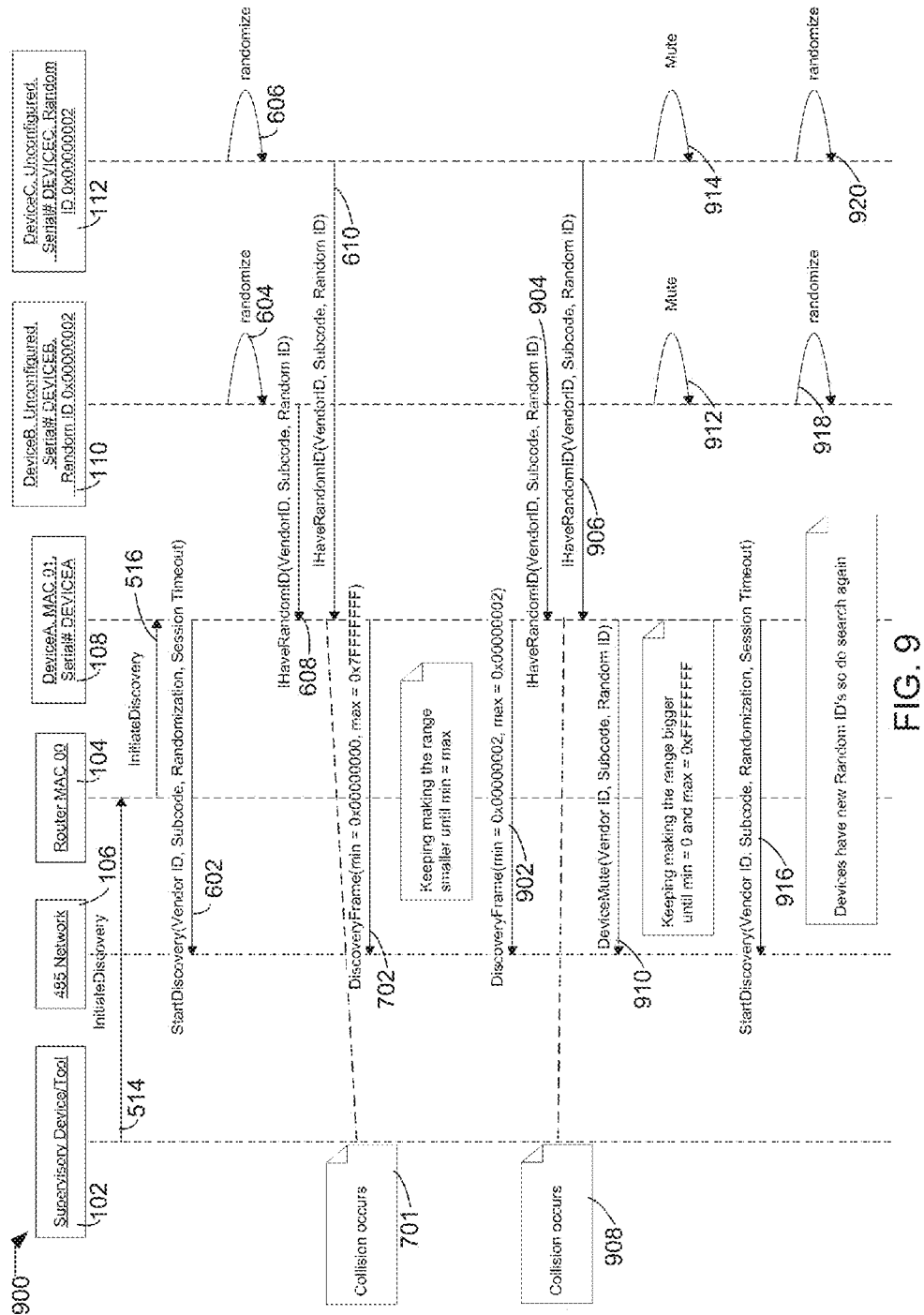
FIG. 9 illustrates a message flow diagram that addresses multiple collision conditions in accordance with an example implementation.

Turning to FIG. 9, a diagram 900 of a message flow diagram that addresses multiple collision conditions in accordance with an example implementation is illustrated. In the current example, both Device B 110 and Device C 112 are unconfigured. The Supervisory Device/Tool 102 initiates discovery of unconfigured devices by sending the "InitiateDiscovery" message 514 to the Router 104. The Router then sends a "InitiateDiscovery" message 516 to Device A 108 that is acting as the NAM. Device A 108 responds to the "InitiateDiscovery" message 516 by sending (broadcasting) a "StartDiscovery" message 602 to the entire 485 network 106. The randomize parameter in the "StartDiscovery" message 602 is set to ALL with a maximum filter range, so all unconfigured devices attached to the 485 network 106 will generate new random numbers as shown in FIG. 7 with 604 and 606 randomize arrows. Device B 110 generates 0x00000002 as its random number identification and Device C 112 also generates 0x00000002 as its random number identification. If the NAM (Device A 108) detects a collision 701 between "IHaveRandomID" messages 608 and 610, a "DiscoveryFrame" message 702 with a smaller filter range may be sent or broadcast to the 485 network 106. The "DiscoveryFrame" message will be repeated until the minimum value and maximum values that define the range are equal (as shown in "DiscoveryFrame" message 902). This also demonstrates that the minimum value may also be changed to define a smaller filter range.

With the filter range set to the minimum and maximum being equal at 0x00000002 in a broadcast "DiscoveryFrame" message 902, both Device B 110 and Device C 112 will respond with "IHaveRandomID" messages 904 and 906. A collision 908 occurs with the "IHaveRandomID" messages 904 and 906 and is detected by the NAM 108. The NAM 108 then broadcasts a "DeviceMute" message 910 to the 485 network 106 that results in Device B 110 and Device C 112 being muted 912 and 914 until another StartDiscovery message is received. Then discovery continues with the range increasing to discover all configurable devices that are not muted.

Once all unmuted unconfigured devices have been discovered, the NAM (Device A 108) starts discovery again with a "StartDiscovery" message 916 being sent to the 485 network. In response to that message, Device B 110 and Device C 112 generate new random number identifiers 918 and 920 and are unmated. Discovery of unconfigured devices then continues as previously described.

It will be understood and appreciated that one or more of the processes, sub-processes, and process steps described in connection with FIGS. 3 and 4 along with message flows 5-9 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in the figures. The memory or software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored there in which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read-only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

What is claimed is:

1. A network asset manager (NAM), comprising:
   a processor;
   a memory;
   a network interface coupled to the processor and the memory that broadcasts a first "Start Discovery" message, which instructs unconfigured devices in an EIA-485 network to generate random number identifiers within a predetermined range set to a maximum range that is specified in the "Start Discovery" message and results in receipt of a "I Have Random ID" message from at least one of the unconfigured devices with a specific random number identifier associated with the at least one of the unconfigured devices, which specific random number identifier is within the predetermined range, where receipt of the "I Have Random ID" message results in a broadcast message from the network interface to at least one of the unconfigured devices using the specific random number identifier.

2. The NAM of claim 1, wherein the NAM is configured to send a second "Start Discovery" message when no "I Have Random ID" messages are received at the network interface.

3. The NAM of claim 1, wherein the NAM is configured to detect a collision between "I Have Random ID" messages received at the network interface from the unconfigured devices.

4. The NAM of claim 3, wherein responsive to detection of the collision, the NAM is configured to send a first "Discovery Frame" message including a first sub-range that is a narrower subset of the predetermined range as the predetermined range message to initiate discovery of unconfigured devices with random number identifiers in the first sub-range.

5. The NAM of claim 4, wherein responsive to detection of the collision and after the first "Discovery Frame" message, the NAM is configured to send a second "Discovery Frame" message including a second sub-range that is a narrower subset of the predetermined range and different from the first sub-range as the predetermined range message to initiate discovery of unconfigured devices with random number identifiers in the second sub-range.

6. The NAM of claim 1, wherein the NAM is configured to transmit a mute message to mute unconfigured devices that have the same random number identifier.

7. A method of discovering devices in an EAI-485 network with a network asset manager (NAM), comprising:
   generating a "Start Discovery" message with a processor that instructs unconfigured devices in the EIA-485 network to generate random number identifiers within a range specified in the "Start Discovery" message;
   sending the "Start Discovery" message from a network interface where the range is set to a maximum predetermined range;
   receiving a "I Have Random ID" message at a network interface, where the "I Have Random ID" message has the generated random number identifier associated with one of the unconfigured devices, which generated random number identifier is within the predetermined range; and
   sending a "Get Device Information" message to one of the unconfigured devices that is associated with the random number identifier in order to receive information parameters from one of the unconfigured devices.

8. The method of discovering devices in an EAI-485 network with a NAM of claim 7, including detecting a collision with the "I Have Random ID" message at the NAM.

9. The method of discovering devices in an EAI-485 network with a NAM of claim 8, wherein responsive to detection of the collision, further comprising generating and sending a first "Discovery Frame" message with a narrower first sub-range of the predetermined range set as the range.

10. The method of discovering devices in an EAI-485 network with a NAM of claim 9, wherein responsive to detection of the collision and after sending the first "Discover Frame" message, further comprising generating and sending a second "Discovery Frame" message with a narrower second sub-range of the predetermined range set as the range, where the second sub-range is different from the first sub-range.

11. The method of discovering devices in an EAI-485 network with a NAM of claim 7, including muting unconfigured devices with a "Mute" message when the unconfigured devices have generated the same random number identifier.

12. The method of discovering devices in an EAI-485 network with a NAM of claim 7 where the predetermined range is defined with a minimum value and a maximum value.

* * * * *